United States Patent [19]
Wells et al.

[11] Patent Number: 5,946,131
[45] Date of Patent: Aug. 31, 1999

[54] MICROSCOPE APERTURE CONTROL

[75] Inventors: Simon Wells, Weston Turville; David R. Clark, Twickenham; Ralph L. Carter, Thame, all of United Kingdom

[73] Assignee: Perkin-Elmer Ltd., Beaconsfield, United Kingdom

[21] Appl. No.: 08/895,056

[22] Filed: Jul. 16, 1997

[30] Foreign Application Priority Data

Jul. 16, 1996 [EP] European Pat. Off. ............. 96305199

[51] Int. Cl.$^6$ .......................... G02B 21/08; G02B 21/36; G02B 27/32; H04N 7/18
[52] U.S. Cl. ......................... 359/350; 359/368; 359/233; 348/79
[58] Field of Search .................................. 359/368, 369, 359/391, 393, 894, 350, 233, 227, 234; 348/79

[56] References Cited

U.S. PATENT DOCUMENTS

| | | |
|---|---|---|
| 4,202,037 | 5/1980 | Glaser et al. . |
| 4,887,892 | 12/1989 | Bacus ........................................ 348/79 |
| 5,308,972 | 5/1994 | Nagano et al. . |
| 5,751,420 | 5/1998 | Iida et al. ................................. 356/328 |
| 5,754,335 | 5/1998 | Takagi et al. ............................ 359/368 |

FOREIGN PATENT DOCUMENTS

| | | |
|---|---|---|
| 0091605 | 10/1983 | European Pat. Off. . |
| 0186490 | 7/1986 | European Pat. Off. . |
| 0426040 | 5/1991 | European Pat. Off. . |
| 731371 A1 | 9/1996 | European Pat. Off. ............... 359/368 |
| 1699251 | 1/1955 | Germany . |
| 8903057 | 4/1989 | WIPO . |

OTHER PUBLICATIONS

U.S. application No. 08/611,264, Microscope Stage Control.
Patent Abstracts of Japan, vol. 018, No. 519 (P–1807), Sep. 1994 and JP–A–06 180425 (Shimadzu Corp; Others: 01), Jun. 28, 1994.

*Primary Examiner*—Jon Henry
*Attorney, Agent, or Firm*—David Aker

[57] ABSTRACT

A system for acquiring IR-data including a microscope with a motor drive stage (48) and a video camera (40) for creating a video image of a sample on the stage. A computer (12) and an associated display (16) are used to create an image of the sample on the display. Graphical markers are superimposed on the image and facilitate the identification of subsequent acquisition of data from points at which data is to be obtained. The markers include representations of the required aperture size and the microscope including an automatically adjustable aperture (26) which can be set under computer control to a required size at each data acquisition point.

7 Claims, 10 Drawing Sheets

MICROSCOPE APERTURE CONTROL

FIELD OF THE INVENTION

This invention relates to the control of microscopes with movable stages. The invention has particular application to the control of a microscope which is used in spectroscopy such as IR spectroscopy.

BACKGROUND ART

In the field of spectroscopy it is known to provide a microscope which can operate in conjunction with a spectrophotometer. Such apparatus are used to obtain infrared spectra of samples. A known microscope is the Perkin-Elmer FT-IR microscope which is described for example in an article by D. W. Shearing, E. F. Young and T. P. Byron entitled "An FT-IR microscope", published in American Laboratory, November 1990. Such a microscope includes a movable stage on which a sample to be investigated can be mounted. The microscope permits both visible observation of the sample and analysis of the sample by infrared radiation, either in a transmitting mode or a reflectance mode. The microscope also includes a video camera which can be used in conjunction with the visible viewing means in order to generate a video image of the sample for display on the display means of a computer.

The microscope can be used in conjunction with a spectrophotometer such as a Perkin-Elmer System 2000 FT-IR spectrophotometer. This instrument can receive infrared radiation either transmitted via the sample or reflected from the sample and provide an output indicating the spectrum of the sample.

The stage of the microscope is movable so that in an initial step it can be moved in an X-Y plane to appropriately locate the sample so that analysis of a selected part of the sample can be achieved.

In European Patent Application No. 95301428.9 we described a method and apparatus for facilitating positioning of the sample stage using images of the stage on a display means of a computer. That invention also provided a facility for enhancing display of acquired data.

A first aspect of the invention described in European Patent Application No. 95301428.9 concerned a method of controlling a motor driven stage of a microscope which has a video camera for viewing a sample on the stage, said method comprising creating on a display means of a computer coupled to the video camera an image of the sample, creating and superimposing on said image one or more graphical markers, using said marker or markers to create coordinate data identifying positions of interest on said sample and using said coordinate data subsequently to control the positioning of said stage.

A second aspect of that invention concerned a method of controlling a motor driven stage of a microscope which has a video camera for viewing a sample on said stage and an associated computer and display means for displaying a video image of an area viewed by said camera, said method comprising creating on said display means an image of an area of interest on said sample, storing data representative of said image, adjusting the position of said stage to identify another area of said sample and storing data representing that image, repeating said steps for a selected number of areas of said sample, combining said data to create an image of a larger area of said sample which is made up of said individual areas of interest, creating and superimposing on said larger area image one or more graphical markers, using said marker or markers to create coordinate data identifying positions on said sample, and subsequently using said coordinate data to control the positioning of said stage.

A third aspect of that invention concerned a system for controlling a motor driven stage of a microscope which has a video camera for viewing a sample on the stage, said system including a display means, and a computer for controlling said display means to create on said display an image of a sample on its microscope stage, said computer being arranged to create and superimpose on said image one or more graphical markers which can be used to create coordinate data identifying positions of interest which are used subsequently to position the stage for analysis of the sample.

A fourth aspect of that invention concerned a system for controlling a motor driven stage of a microscope which has a video camera for viewing a sample on the stage, said system including a display means and a computer for controlling the display to create on said display an image of an area of a sample on the microscope stage, said computer being arranged to store data representative of an image of the viewed area, to move the stage to another area and store data representative of that area, to repeat these steps for a selected number of areas and to combine the stored data to provide an image of the sample which is larger than the individual areas, said computer also being arranged to come to be displayed and superimposed on the larger area image one or more graphical members which are used to create coordinate data identifying positions of interest on the sample which can be stored and used subsequently to position the stage for analysis of the sample.

Microscopes of the above described type include an aperture which can be adjusted to define a boundary around the area of interest to be scanned. In conventional microscopes this adjustment is carried out manually.

SUMMARY OF THE INVENTION

According to the present invention there is provided a system for acquiring IR-data including an IR-microscope with a motor driven stage, said microscope having a video camera for viewing a sample on the stage and said system including display means and a computer for controlling the display means to create on said display an image of an area of a sample on the microscope stage, said computer being arranged to create and superimpose on said image one or more graphical markers which can be used to create coordinate data identifying positions of interest which are used subsequently to position the stage for analysis of the sample, wherein said microscope includes an aperture assembly which can provide an adjustable aperture for radiation to pass therethrough, and said computer is operable to create and superimpose on said image a marker representing an aperture whereby for each position of interest an aperture of defined position and size can be specified, the data representing said aperture subsequently being used by said computer to provide control signals for adjusting said aperture to the defined size for each position of interest.

The aperture assembly may be arranged to provide a rectangular or square aperture. The aperture may be defined by four movable blades. Each blade may have an inner edge defining a side of the aperture and each blade is movable in a direction perpendicular to that edge.

Each blade may have an associated motor which is operable in response to control signals from the computer to cause movement of its associated blade to a desired position.

The microscope assembly can be mounted so that it is rotatable to thereby provide for different aperture orientations.

BRIEF DESCRIPTION OF THE DRAWINGS

The invention will be described now by way of example only, with particular reference to the accompanying drawings. In the drawings.

DETAILED DESCRIPTION OF THE PREFERRED EMBODIMENT

Figure 1:
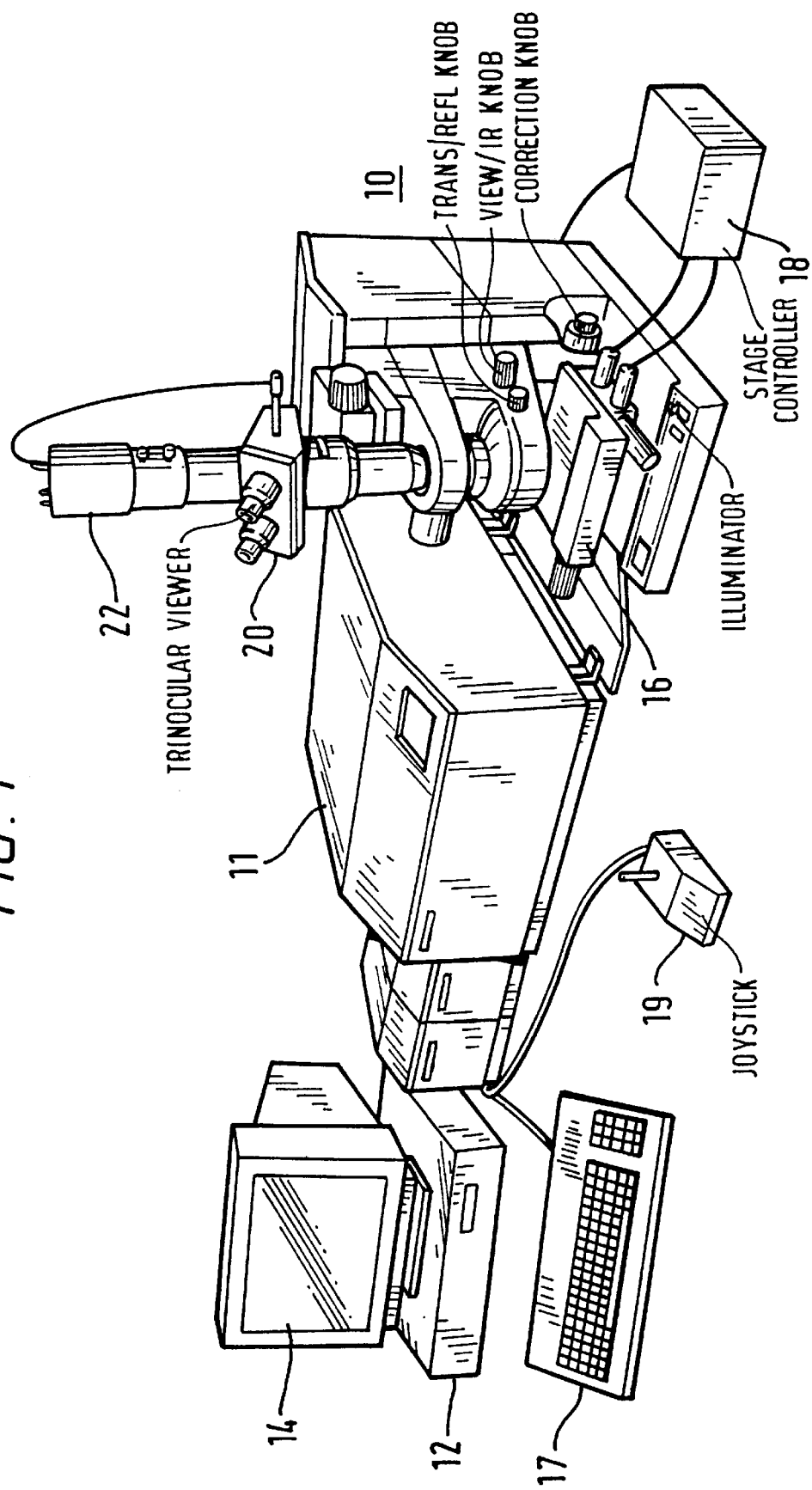
FIG. 1 is a schematic view of an FT-IR microscope operating in accordance with the principles described in European Patent Application 95301428.9.

The invention will be described specifically with reference to an FT-IR microscope used in conjunction with an IR spectrophotometer. A basic arrangement is illustrated in FIG. 1 of the drawings. It comprises a microscope (10), a spectrophotometer (11), a computer (12) with a display means (14), a keyboard (17) and joystick (19). The microscope includes a movable stage (16) which can be driven in X and Y directions by means of a stage controller (18). The microscope also includes viewing means (20) for enabling the sample on the stage (16) to be viewed prior to an analysis step and also includes a video camera (22) which can be used to generate a video image of the sample stage.

Figure 2:
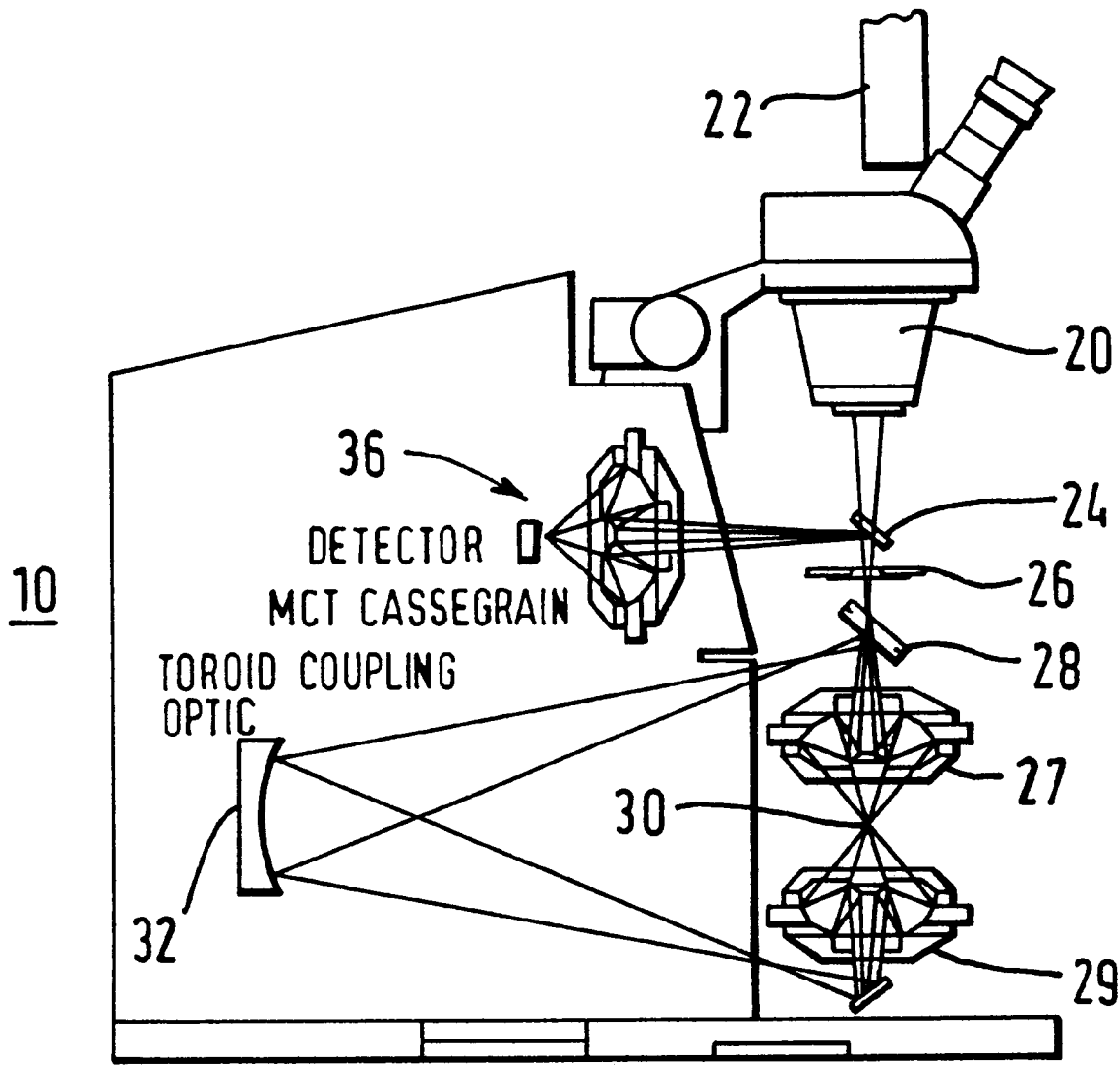
FIG. 2 is a side elevation showing the principal elements of that FT-IR microscope.

The microscope (10) can be an FT-IR microscope of the type manufactured by Perkin-Elmer Corporation. Such a microscope has a basic structure which is illustrated in FIG. 2 of the drawings. The microscope includes the optical microscope (20), a view/IR mirror (24), a remote aperture (26), a transmittance/reflectance mirror (28), an objective Cassegrain lens assembly (27) and a condenser Cassegrain lens assembly (29) with the sample position (30) being located therebetween. The drivable stage (16) is located at the sample position. In addition, the microscope includes a toroid coupling optic (32) which is used to direct radiation towards the sample.

Alongside the view/IR slider there is provided a detector (36) of the MCT type which can provide data in response to received infrared radiation which is fed to the spectrophotometer for analysis. It is not necessary for the purposes of the present invention to describe the microscope in any more detail since its function will be apparent to those skilled in the art. A fuller description can be found in the manual of The Perkin-Elmer FT-IR microscope and also in the previously referred to article entitled "An FT-IR microscope" published in American Laboratory of November 1990.

In operating such an arrangement a sample is placed upon the movable stage (16) and the first step is to position the sample prior to analysing it by irradiating it with infrared radiation. The sample is positioned by viewing it either optically through the microscope (20) or on the display means (14) using the video camera (22), or both. Once the stage has been positioned appropriately, then a selected area of the sample can be analysed by obtaining an infrared spectrum. In European Patent Application No. 95301428.9 we describe a technique for identifying areas of interest on the sample using the display means (14) and the subsequent control of the stage during an analysis step to enable those areas of interest to be analysed automatically.

Figure 3:
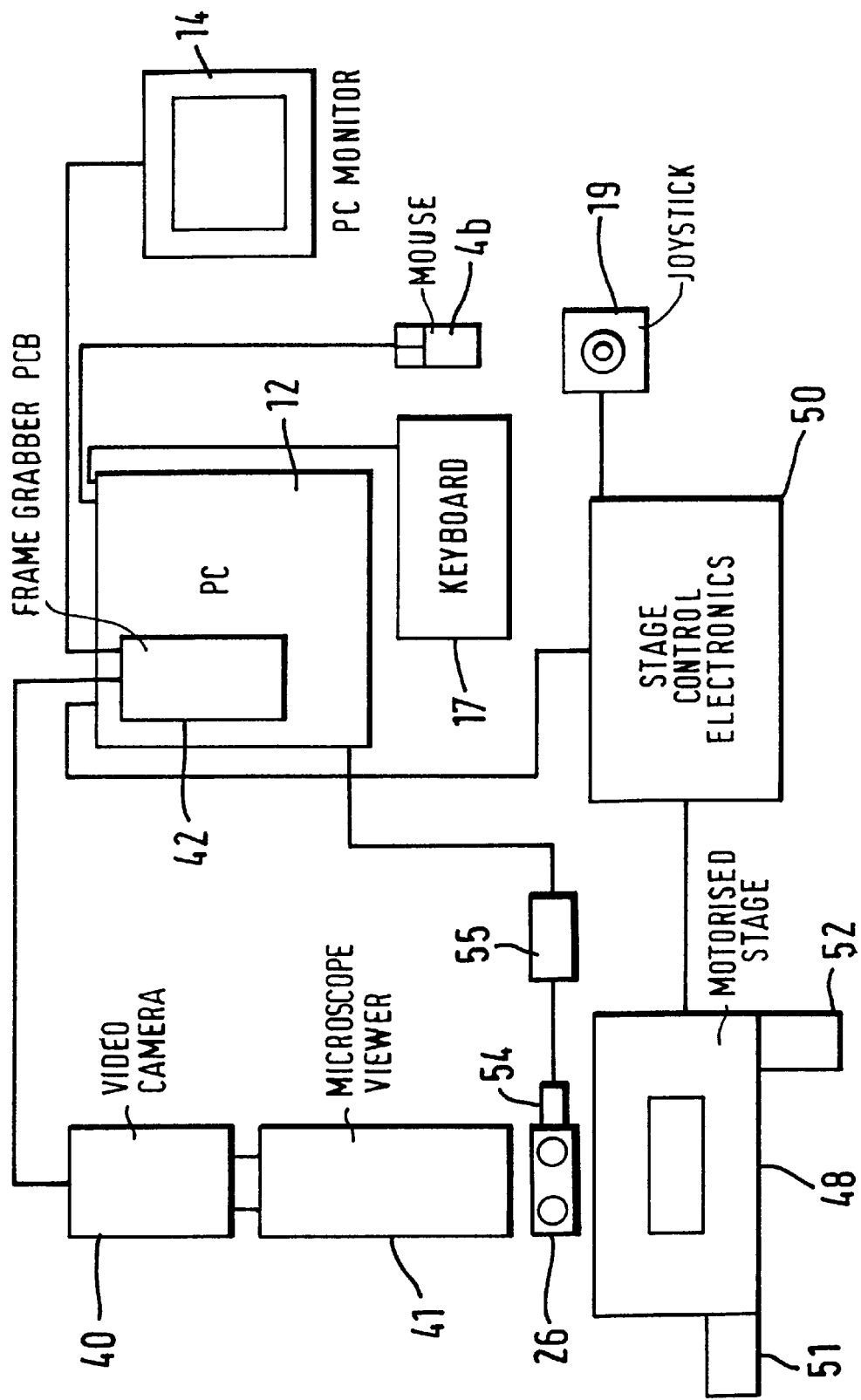
FIG. 3 is a schematic block diagram of a microscope assembly in accordance with an embodiment of the present invention.

This technique modified in accordance with the present invention will be described now with reference to FIG. 3 of the drawings. In FIG. 3 the video camera is shown at (40) and operates in conjunction with the microscope viewer which is illustrated at (41). The video camera is connected to a circuit board (42) of the computer (12), that circuit board providing the computer (12) with the capability of controlling the display means to display a video image of the movable stage (16). The circuit board (42) is a commercially available board known as a frame grabbing card. Associated with the computer is the keyboard (17) and a pointer control, typically a mouse, (46). The motorised stage is shown at (48) and operates in conjunction with stage control electronics (50) which are coupled to the computer (12). Associated with the electronics (50) is the joystick (19) which enables an operator to manually control movement of the movable stage (48). The stage (48) includes motors (51, 52) for driving the stage in an X-Y plane.

In the present arrangement the microscope includes an aperture assembly (26). The aperture assembly includes a plurality of blades which can be moved to define an aperture of a selected size. The blades are driven by associated motors (54) which can be energised by signals from drive circuitry (55) in response to control data from the computer (12).

Figure 4:
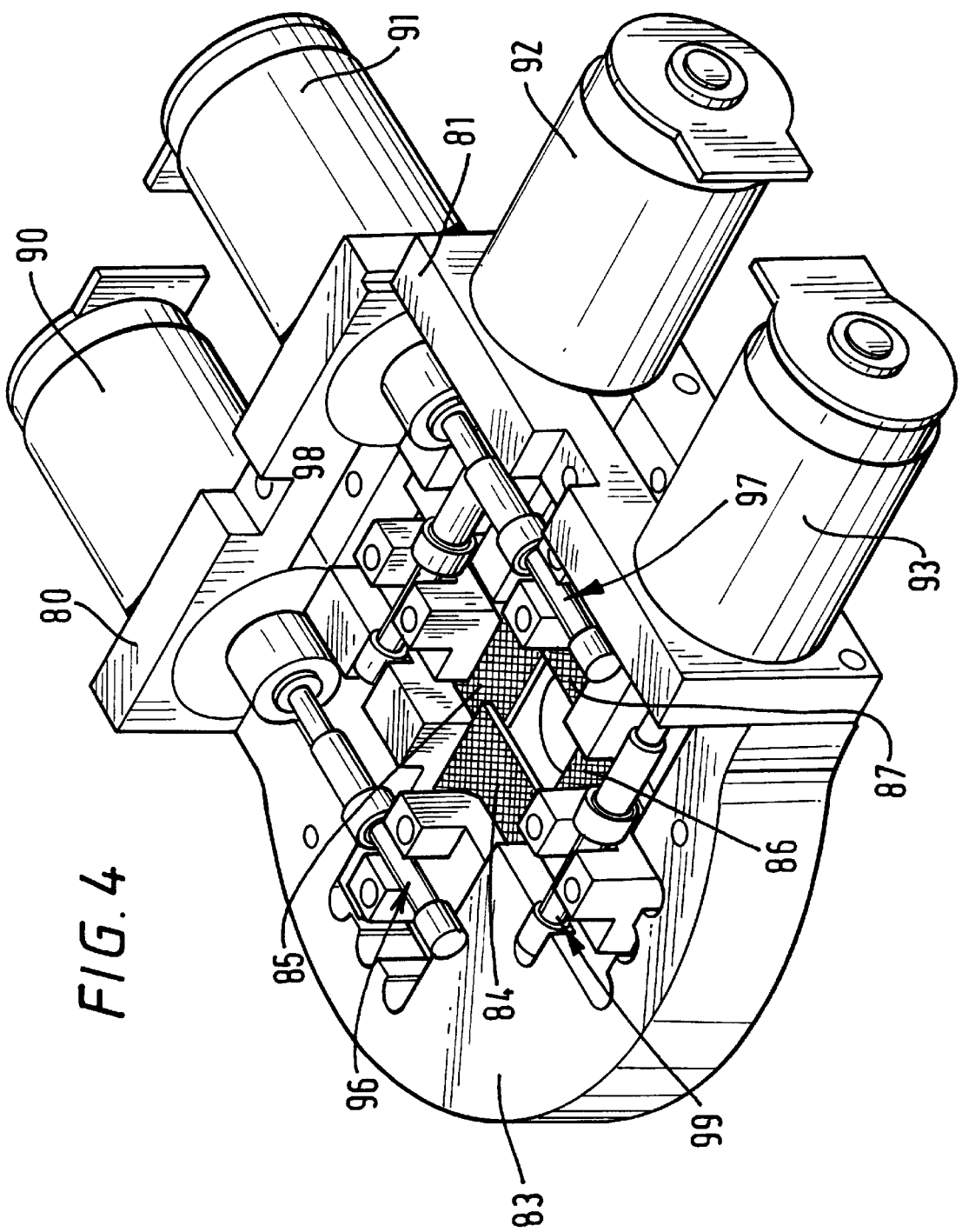
FIG. 4 is a perspective view of an aperture assembly used in the microscope of FIG. 3.

The apertures assembly is shown in more detail in FIG. 4. The assembly comprises a pair of upright plates (80, 81) which extend at right angles to each other and to which is attached a support housing (83) for aperture blades. The housing (83) supports four aperture blades (84, 85, 86, and 87) centrally thereof. Each blade is independently movable toward or away from the centre of the assembly. Thus, blades (84, 86) can be moved toward or away from each other and the blades (85, 87) can also be moved toward or away from each other along a direction orthogonal to the direction and movement of the blades (84, 86). Drive to move the blades is provided by four motors (90, 91, 92, 93) which are secured as shown to the plates (80, 81). Motor (90) drives the blade (84) via gearing on its output shaft and a rack and pinion coupling (96), motor (91) drives blade (87) via gearing on its output shaft and a rack and pinion coupling (97), motor (92) drives blade (85) via gearing on its output shaft and a rack and pinion coupling (98) and motor (93) drives blade (86) via gearing on its output shaft and a rack and pinion coupling (99).

Thus, each plate can be moved independently and energising signals for the motors to effect the independent movement are applied from the drive circuitry (55) under the control of the software operating on computer (12).

Figure 4A:
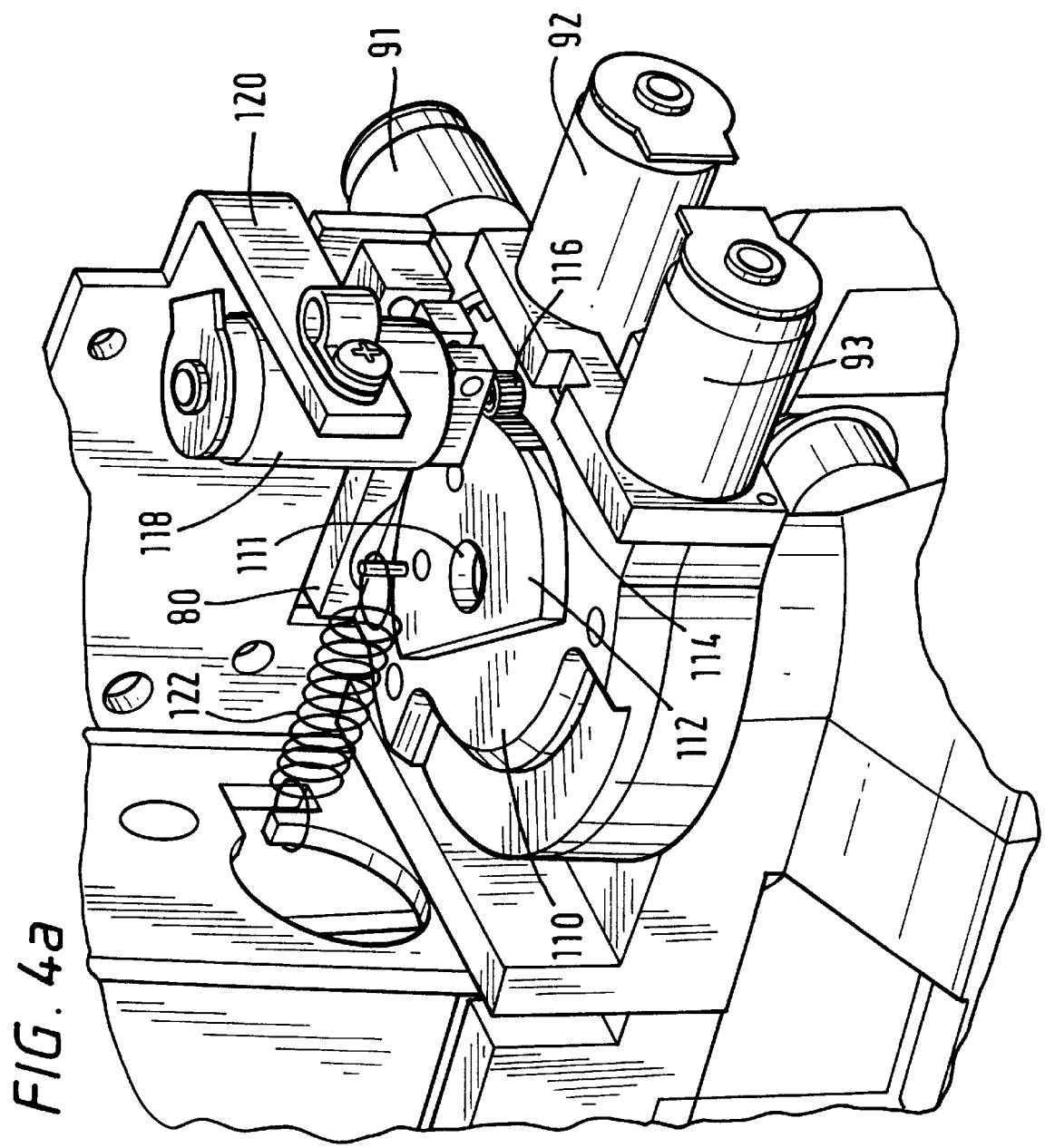
FIG. 4a is a view similar to FIG. 4 showing the aperture assembly mounted in a microscope.

FIG. 4a illustrates the way in which the aperture assembly is mounted in the microscope so as to be rotatable about an upright axis of the microscope. The aperture assembly is carried on a shelf (105) which is secured to the microscope chassis (106). The shelf has one or more ball bearings (not shown) on which the aperture assembly sits, the ball bearings enabling the assembly to move over the shelf surface. The aperture assembly includes an upper plate (110) (not shown in FIG. 4), which covers the block assembly with the exception of a central region defined by a circular aperture (111) which defines a path for radiation to propagate through the assembly. The upper plate (110) has a raised, generally semi circular, portion (112) the outer cylindrical part of which has teeth (114) formed thereon. The teeth (114) are engaged by corresponding teeth formed on a gear wheel (116) carried on the end of the output shaft of a motor (118). The motor (118) is supported from a bracket (120) fixed integrally with the chassis of the microscope.

Thus when the motor (118) is energised the rotation of its output shaft is transmitted through the engagement of wheel (116) and teeth (114) to cause the aperture assembly to rotate as a unit about a vertical axis of the microscope. The motor is bi-directional so that rotation can be in either sense. Thus the orientation of the rectangular aperture defined by the blades (84 to 87) can be rotated through 90°. By appropriately setting the blades (84 to 87) a 90° angle of rotation is sufficient to encompass any orientation of the aperture. This is controlled by the software running on the computer (12).

A spring (122) extends between an upstanding pin (124) on the upper plate (110) and a projection (126) on the microscope chassis. This is to minimise the effect of backlash in the motor (118).

In the following description it will be assumed that the software is operating in a Windows environment but it will be appreciated that the invention is not restricted to such an example. The computer (12) is thus one which can operate the Windows operating system.

Initially the microscope (20) is used to view the sample on the stage and also an image of a portion of the sample is generated on the display means (14) using the video camera (12). In this mode the aperture defined by the aperture assembly (26) is set to its fully open position so that a full field of view is displayed on the display means (14). The stage (16) can be controlled electronically through the controller (18) either by use of the joystick controller (19) or in response to commands generated by the computer (12). Briefly the video camera (12) samples the image and transmits electronic data to the frame grabbing card (42) of the computer and this data is processed and used to generate a display which is a live video image of the sample. In addition the software stored in the computer can superimpose graphical images on the image of the sample. These images include a rectangular outline representing the boundary of an aperture.

Figure 5:
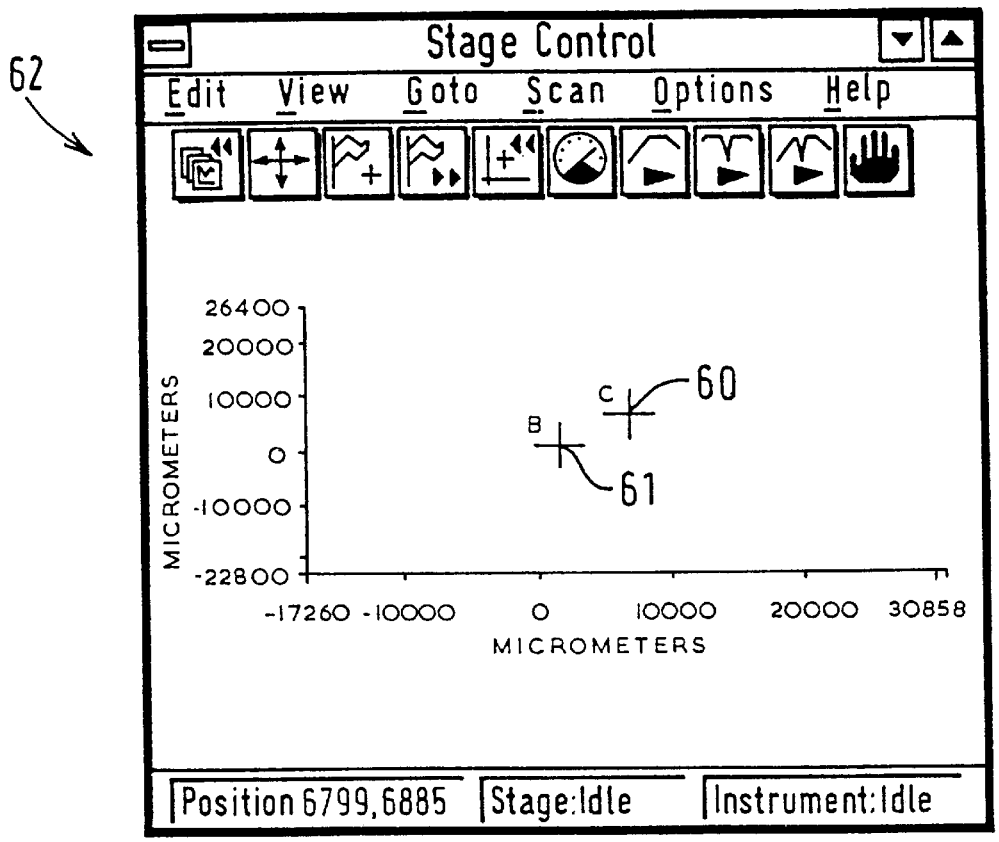
FIGS. 5, 5a, 5b, 5c, 6 and 7 show displays which can be generated on the display means of FIG. 3.
Figure 6:
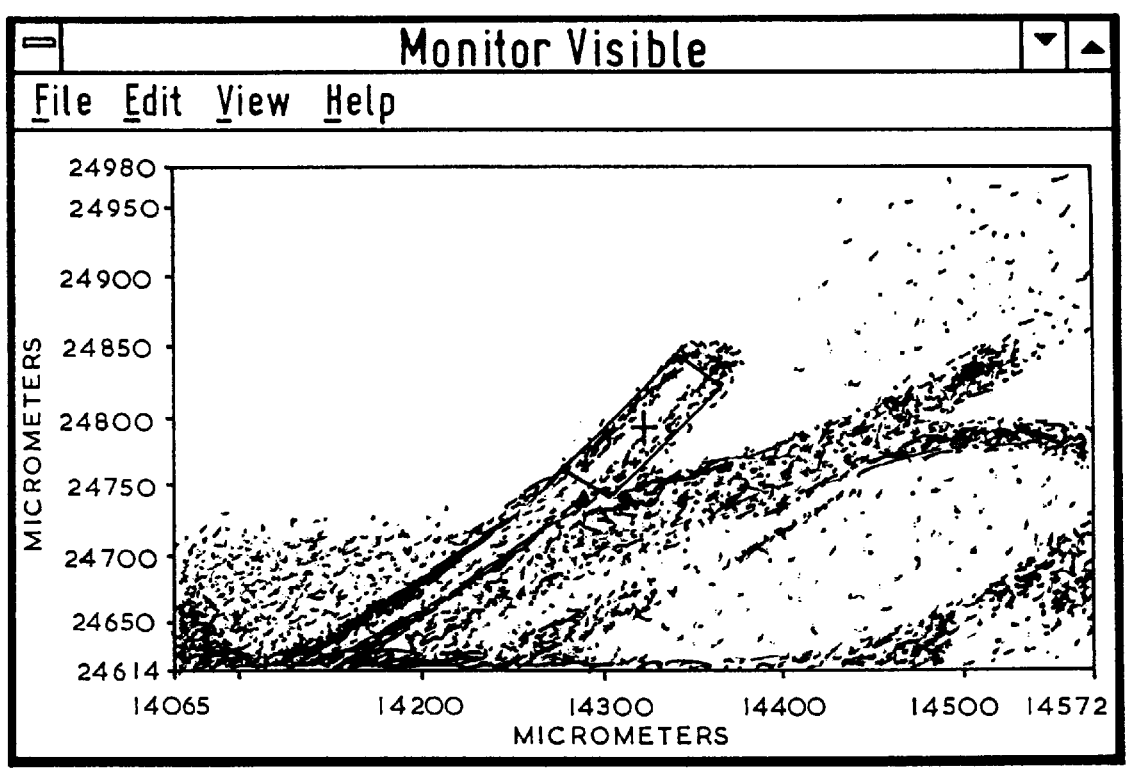

FIGS. 5 and 6 show typical displays which can be created. The first display is known as a stage control window which enables an operator to adjust the position of the sample stage. As can be seen, the display includes markers (60 and 61). The marker (60) is a current aperture marker which shows the position on the sample stage of the microscope aperture. It can be used to move the sample stage to different positions without using the joystick. In order to do this the mouse is controlled to move the mouse pointer close to the marker (60). The marker (60) is then dragged across the display by moving the mouse position. The sample stage is then moved by the stage control electronics (50) to a position corresponding to the repositioned pointer (60). It will be appreciated that the stage can be continuously repositioned using this procedure. The display shown in FIG. 5 also includes a tool bar facility (62) which comprises a number of icons selectable using the mouse.

FIG. 6 shows an example of a display which is a video image of an area of the sample itself. The computer is programmed so that markers can be superimposed on the image of the sample and moved around the sample by means of a pointer control, typically the mouse. In use of the apparatus a sample to be analysed is placed on the sample stage of the microscope. The sample stage is positioned roughly by moving the stage with the joystick control. This positioning can be carried out visually.

The two displays (FIG. 5 and FIG. 6) are then viewed on the display means simultaneously. An operator identifies on the FIG. 6 Window an area of interest and using the current stage position marker (60), as described above, moves the stage until that area is centred on the display. Then by using the mouse control buttons the operator marks the area of intent and this produces a marker (61) which does not subsequently move relatively to the area it identifies. The display (4) can also display the coordinates of the marked position as indicated by (64) in FIG. 5. Those coordinates are also in the computer memory.

Figure 5C:
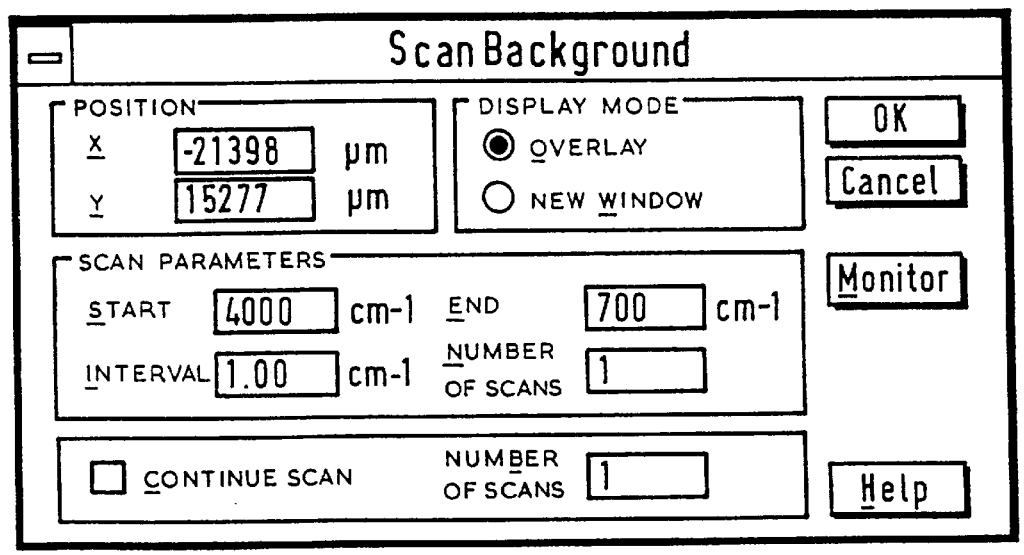
Figure 5A:
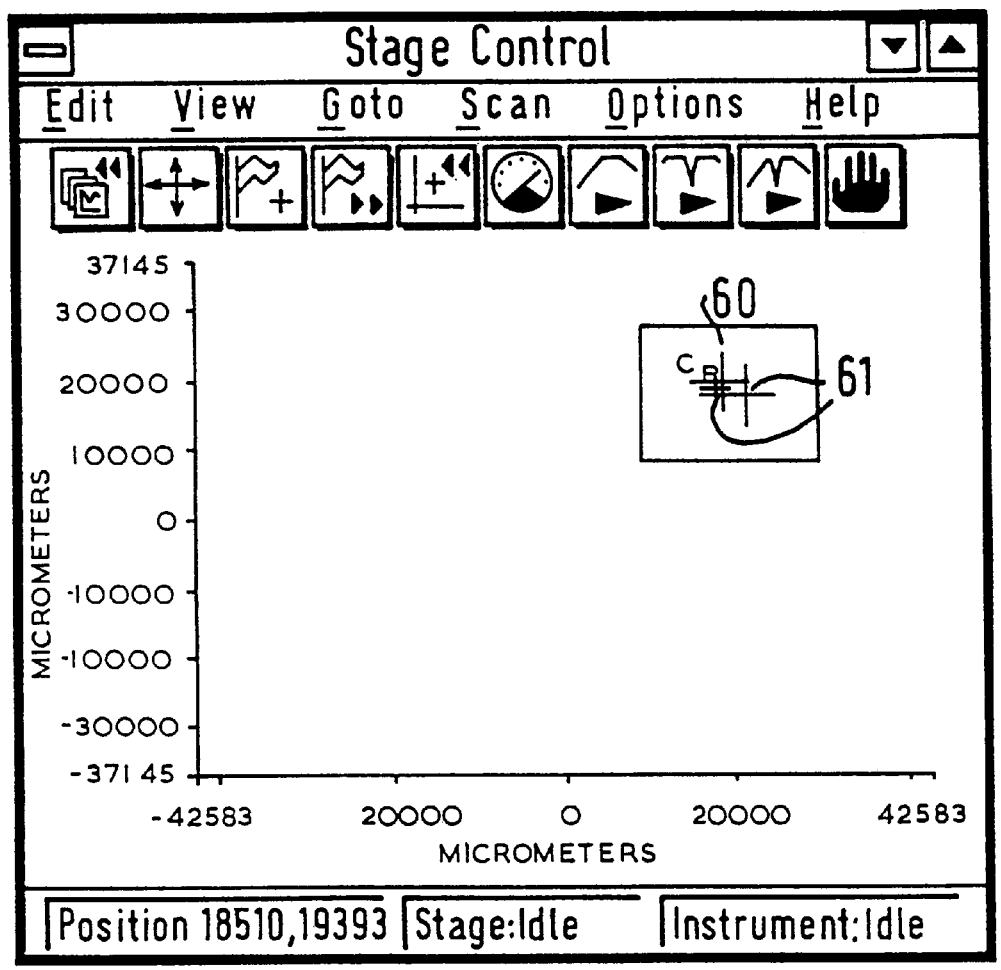

The software then allows an operator to move to another area of interest using the marker (60) as described above and to store in a similar manner data representative of the coordinates of that point of interest. This process can be repeated for as many areas of interest as necessary and coordinate data relating to those areas of interest are stored in the computer memory. For each area of interest a marker (61) will appear on the display. FIG. 5a shows a display with a number of marked points (61). FIG. 5a also shows how a box can be drawn around the points under the control of a mouse and then that area defined by the box is expanded to create another Window (FIG. 5b) with the points displayed on a different scale.

Figure 5B:
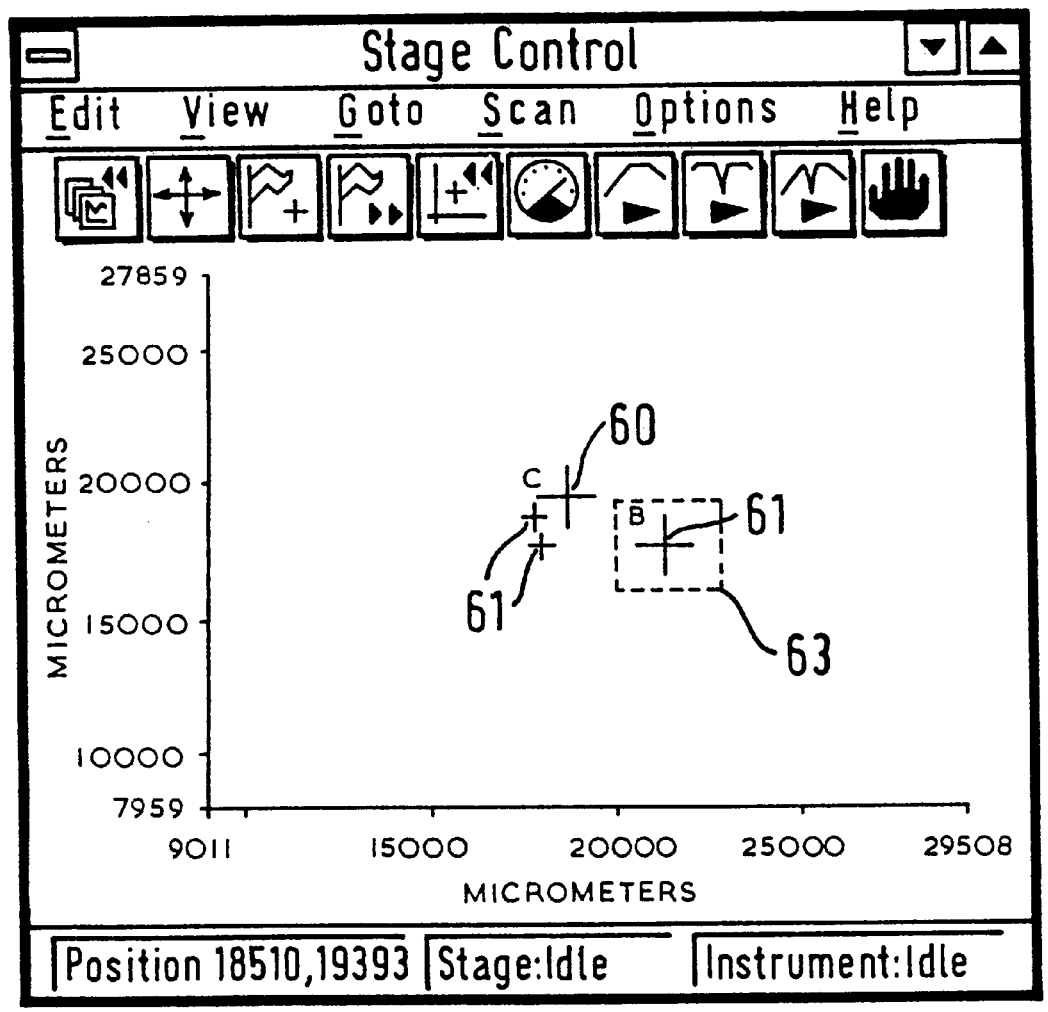

For each position (61) the software allows an operator using the mouse or keyboard to draw around the position (61) a rectangular outline such as that shown at (63) in FIG. 5b. This outline represents the boundary of the aperture to be used during a subsequent data acquisition stage. Outlines for each point (61) can be created and data representing the coordinates of these outlines are stored in the computer memory. It will be appreciated that although the aperture (63) is shown in FIG. 5b aligned with the X and Y axes of the display it can by manipulation of the mouse or operation of the keyboard be placed in any selected orientation relative to those axes.

The software for the above operation operates generally as follows. The software continuously polls the stage control electronics (50) for the current stage position. This software has been precalibrated with camera image size information and is then able to calculate the stage coordinates of any point on the live video image displayed on the display means (14). Once the feature on the sample is visible in the display it can be rapidly centred by pointing at it using the mouse, as explained above. The software then calculates the coordinates and causes the stage (16) to move to them. The current centre of view is marked with a small computer generated marker. As the stage is moved this marker is repositioned so as to remain with the feature it is marking. This is repeated for each point of interest to be defined.

Figure 7:
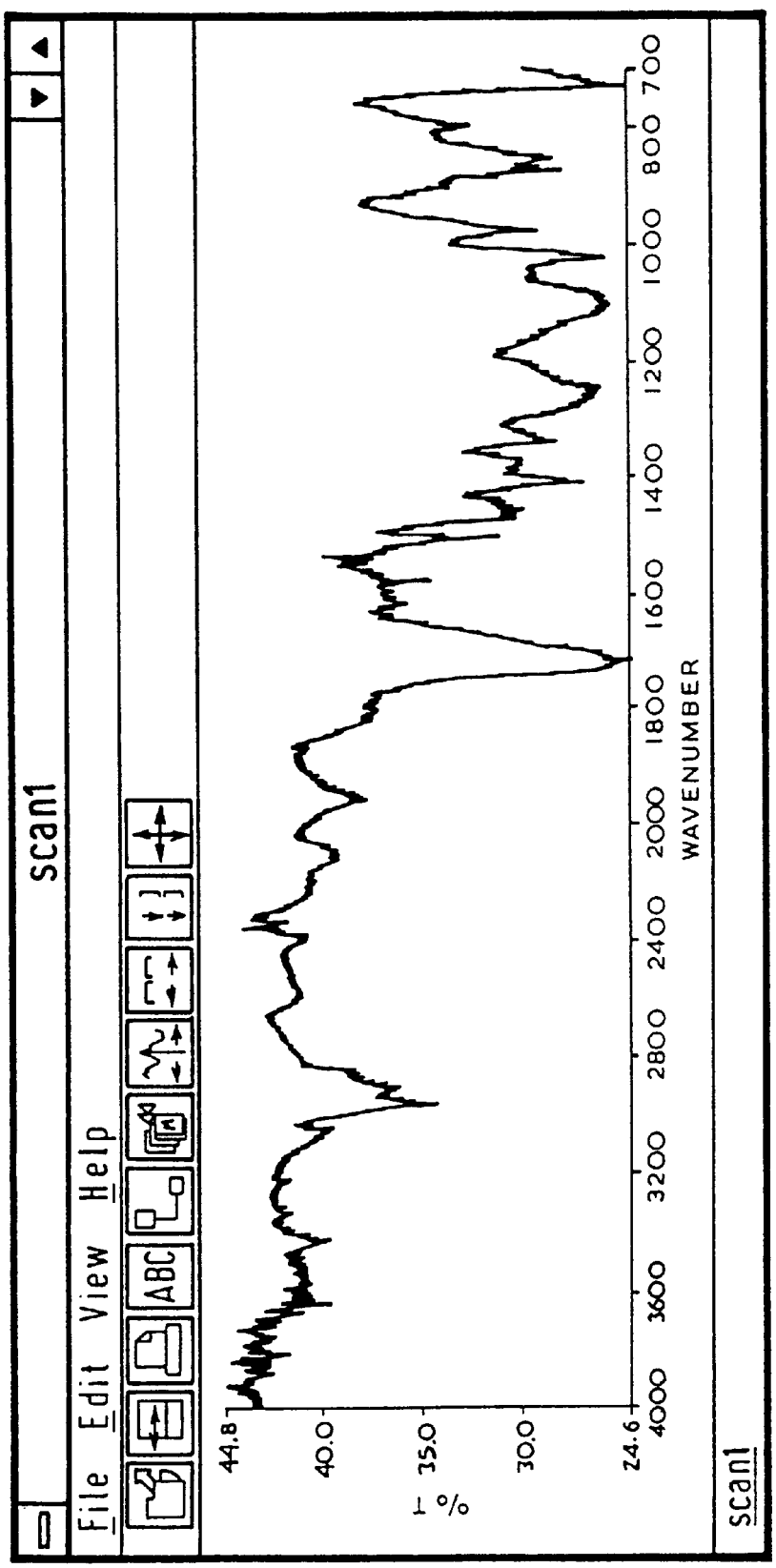

Subsequently the software is used to control automatically the acquisition of analysis data for each of the points of interest during an infrared scanning operation. In setting up for spectra acquisition an operator is presented with a Window of the type shown in FIG. 5c. this enables the operator to set up the scan parameters. This particular Window has been designed for use with the Paragon 1000 instrument. In the acquisition of spectra operation the stage is moved automatically to positions corresponding to the stored coordinate data, i.e. the positions identified by markers (61). At each position the computer (12) provides control signals which are fed to the drive circuitry (55) to cause the motors (90, 93) to be energised such that the blades (84 to 87) are positioned to define the pre-set aperture. In addition the motor (118) is energised so that the aperture assembly is rotated to bring it into the selected orientation. It will be appreciated that the present arrangement allows each position from which a spectrum is to be acquired to have its own aperture setting which can be different from the settings of all other positions of interest. At each position the sample is scanned with infrared radiation in the usual manner and a spectrum acquired by the spectrophotometer. These spectra can be displayed on the display means and FIG. 7 illustrates an example of such a display.

Thus it will be seen that the above arrangement provides an operator with an ability to superimpose computer generated graphic markers on a live video image of a sample under investigation, these images being displayed on a display screen of a computer. The arrangement also enables an operator to define data representing the position of points of interest on the sample using the computer generated graphic markers and the live video image of the sample. Subsequently the coordinate data can be used during a scanning step to automatically position the sample stage (16) in order to acquire infrared spectral data for each of the points of interest identified by an operator. A further feature of the present arrangement is that the markers (61) enable an operator to return the stage easily and accurately to a position at which a marked point on a sample can be viewed again. The ability to graphically define the aperture for each position greatly facilitates aperture setting. Also, once the data relating to the positions of interest has been stored in the computer the subsequent acquisition of IR data can operate automatically under the control of the computer (12) and this substantially increases the efficiency of the system.

I claim:

1. A system for acquiring IR-data including an IR-microscope with a motor driven stage, said microscope having a video camera for viewing a sample on the stage and said system including display means and a computer for controlling the display means to create on said display an image of an area of a sample on the microscope stage, said computer being arranged to create and superimpose on said image one or more graphical markers which can be used to create coordinate data identifying positions of interest which are used subsequently to position the stage for analysis of the sample, wherein said microscope includes an aperture assembly which can provide an adjustable aperture for radiation to pass therethrough, and said computer is operable to create and superimpose on said image a marker representing an aperture whereby for each position of interest an aperture of defined position and size can be specified, the data representing said aperture subsequently being used by said computer to provide control signals for adjusting said aperture to the defined size for each position of interest.

2. A system according to claim 1, wherein said aperture assembly is arranged to provide a rectangular or square aperture.

3. A system according to claim 2, wherein the aperture is defined by four movable blades.

4. A system according to claim 3, wherein each blade has an inner edge defining a side of the aperture, and each blade is movable in a direction perpendicular to that inner edge.

5. A system according to claim 3, wherein each blade has an associated motor which is operable in response to control signals from the computer to cause movement of the blade to a desired position.

6. A system according to claim 1, wherein said aperture assembly is rotatable so that the aperture may be placed in any selected orientation.

7. A system according to claim 4, wherein each blade has an associated motor which is operable in response to control signals from the computer to cause movement of the blade to a desired position.

* * * * *